(12) United States Patent
Olson et al.

(10) Patent No.: US 11,348,305 B2
(45) Date of Patent: May 31, 2022

(54) TECHNIQUES FOR LOCATING VIRTUAL OBJECTS RELATIVE TO REAL PHYSICAL OBJECTS

(71) Applicant: APPLE INC., Cupertino, CA (US)

(72) Inventors: Earl M. Olson, Santa Clara, CA (US); Nicolai Georg, Sunnyvale, CA (US); Omar R. Khan, Sunnyvale, CA (US); James M. A. Begole, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/141,280

(22) Filed: Jan. 5, 2021

(65) Prior Publication Data

US 2021/0150801 A1  May 20, 2021

Related U.S. Application Data

(63) Continuation of application No. 16/406,298, filed on May 8, 2019, now Pat. No. 10,950,031.
(Continued)

(51) Int. Cl.
*G06T 15/10* (2011.01)
*G06T 19/00* (2011.01)
(Continued)

(52) U.S. Cl.
CPC .......... *G06T 15/10* (2013.01); *G02B 27/0101* (2013.01); *G06F 16/58* (2019.01);
(Continued)

(58) Field of Classification Search
CPC ......... G06T 15/10; G06T 19/006; G06T 7/40; G06T 2210/61; G06T 7/12; G06T 19/00;
(Continued)

(56) References Cited

U.S. PATENT DOCUMENTS 9,898,844 B2   2/2018 Mullins
2012/0264510 A1 10/2012 Wigdor et al.
(Continued)

FOREIGN PATENT DOCUMENTS

CN   107111370 A   8/2017
CN   107850936 A   3/2018
(Continued)

OTHER PUBLICATIONS

China National Intellectual Property Administration, First Office Action, Chinese Patent Application No. 201910395669.8, 15 pages, dated Sep. 24, 2021.
(Continued)

*Primary Examiner* — Xilin Guo
(74) *Attorney, Agent, or Firm* — Thompson Hine LLP

(57) ABSTRACT

In one implementation, a non-transitory computer-readable storage medium stores program instructions computer-executable on a computer to perform operations. The operations include obtaining first content representing a physical environment in which an electronic device is located using an image sensor of the electronic device. A physical feature corresponding to a physical object in the physical environment is detected using the first content. A feature descriptor corresponding to a physical parameter of the physical feature is determined using the first content. Second content representing a computer generated reality (CGR) environment is generated based on the feature descriptor and presented on a display of the electronic device.

20 Claims, 7 Drawing Sheets

Related U.S. Application Data

(60) Provisional application No. 62/671,097, filed on May 14, 2018.

(51) Int. Cl.
*G06F 16/58* (2019.01)
*G02B 27/01* (2006.01)
*G06T 7/40* (2017.01)

(52) U.S. Cl.
CPC .............. G06T 7/40 (2013.01); G06T 19/006 (2013.01); *G02B 2027/014* (2013.01); *G06T 2210/61* (2013.01); *G09G 2340/12* (2013.01)

(58) Field of Classification Search
CPC ....... G06T 7/50; G06F 16/58; G06F 3/04815; G06F 3/012; G06F 16/7837; G06F 16/5854; G02B 27/0101; G02B 2027/014; G09G 2340/12

See application file for complete search history.

(56) References Cited

U.S. PATENT DOCUMENTS

| | | |
|---|---|---|
| 2013/0044128 A1 | 2/2013 | Liu et al. |
| 2014/0125668 A1* | 5/2014 | Steed ...................... G06T 15/50 345/426 |
| 2015/0187108 A1 | 7/2015 | Mullins |
| 2016/0026242 A1 | 1/2016 | Burns et al. |
| 2016/0189426 A1 | 6/2016 | Thomas et al. |
| 2016/0217616 A1 | 7/2016 | Kraver |
| 2016/0253842 A1 | 9/2016 | Shapira et al. |
| 2016/0349510 A1 | 12/2016 | Miller |
| 2017/0069134 A1 | 3/2017 | Shapira et al. |
| 2017/0287218 A1 | 10/2017 | Nuernberger et al. |
| 2018/0075663 A1 | 3/2018 | Steed et al. |
| 2018/0114264 A1 | 4/2018 | Rafii |
| 2018/0199039 A1 | 7/2018 | Trepte |
| 2018/0310116 A1* | 10/2018 | Arteaga ................ G06T 19/006 |
| 2018/0365897 A1* | 12/2018 | Pahud ..................... G06T 15/40 |
| 2019/0130648 A1 | 5/2019 | Duca |
| 2019/0180499 A1 | 6/2019 | Caulfield |

FOREIGN PATENT DOCUMENTS

| | | |
|---|---|---|
| CN | 108027653 A | 5/2018 |
| WO | 2017/214040 | 12/2017 |
| WO | 2018/035507 A1 | 2/2018 |

OTHER PUBLICATIONS

China National Intellectual Property Administration, First Office Action (English Translation), Chinese Patent Application No. 201910395669.8, 27 pages, dated Sep. 24, 2021.

* cited by examiner

TECHNIQUES FOR LOCATING VIRTUAL OBJECTS RELATIVE TO REAL PHYSICAL OBJECTS

CROSS-REFERENCE TO RELATED APPLICATION

This Application is a continuation of U.S. patent application Ser. No. 16/406,298 filed May 8, 2019, which claims the benefit of U.S. Provisional Application Ser. No. 62/671,097 filed May 14, 2018, each of which is incorporated herein in its entirety.

TECHNICAL FIELD

The present disclosure generally relates to systems, methods, and devices for computer generated reality (CGR) experiences for presentation on a display of an electronic device, and in particular, to dynamically generating such CGR experiences based on physical environment geometries proximate to the electronic device.

BACKGROUND

Various electronic devices exist, such as head-mound devices (also known as headsets and HMDs), with displays that present users with experiences in which they may be fully immersed in a surrounding physical environment, fully immersed in a virtual reality environment comprising virtual objects, or anywhere in between. These devices often generate experiences utilizing pre-canned (or fixed) content to represent a CGR environment. When presented on a display of an electronic device, that pre-canned content provides the same experience regardless of the physical environment in which the electronic device is physically located.

SUMMARY

Various implementations disclosed herein include devices, systems, and methods for dynamically generating CGR experiences based on physical environment geometries. In one implementation, a non-transitory computer-readable storage medium stores program instructions computer-executable on a computer to perform operations at an electronic device with a display and an image sensor. The operations include obtaining first content representing a physical environment in which the electronic device is located using the image sensor. A physical feature corresponding to a physical object in the physical environment is detected using the first content. A feature descriptor corresponding to a physical parameter of the physical feature is determined using the first content. Second content representing a CGR environment is generated based on the feature descriptor and presented on the display.

In another implementation, a system includes an electronic device with a display and an image sensor, a processor, and a computer-readable storage medium. The computer-readable storage medium comprises instructions that upon execution by the processor cause the system to perform operations. The operations include obtaining first content representing a physical environment in which the electronic device is located using the image sensor. A physical feature corresponding to a physical object in the physical environment is detected using the first content. A feature descriptor corresponding to a physical parameter of the physical feature is determined using the first content. Second content representing a CGR environment is generated based on the feature descriptor and presented on the display.

In another implementation, a system includes an electronic device with a display and an image sensor, a processor, and a computer-readable storage medium. The computer-readable storage medium comprises instructions that upon execution by the processor cause the system to perform operations. The operations include detecting a physical feature corresponding to a physical object in a physical environment in which the electronic device is located using the image sensor. A feature descriptor corresponding to a physical parameter of the physical feature is determined using image data generated by the image sensor that depicts the physical environment. Content is generated that represents a CGR environment based on the feature descriptor and is presented on the display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
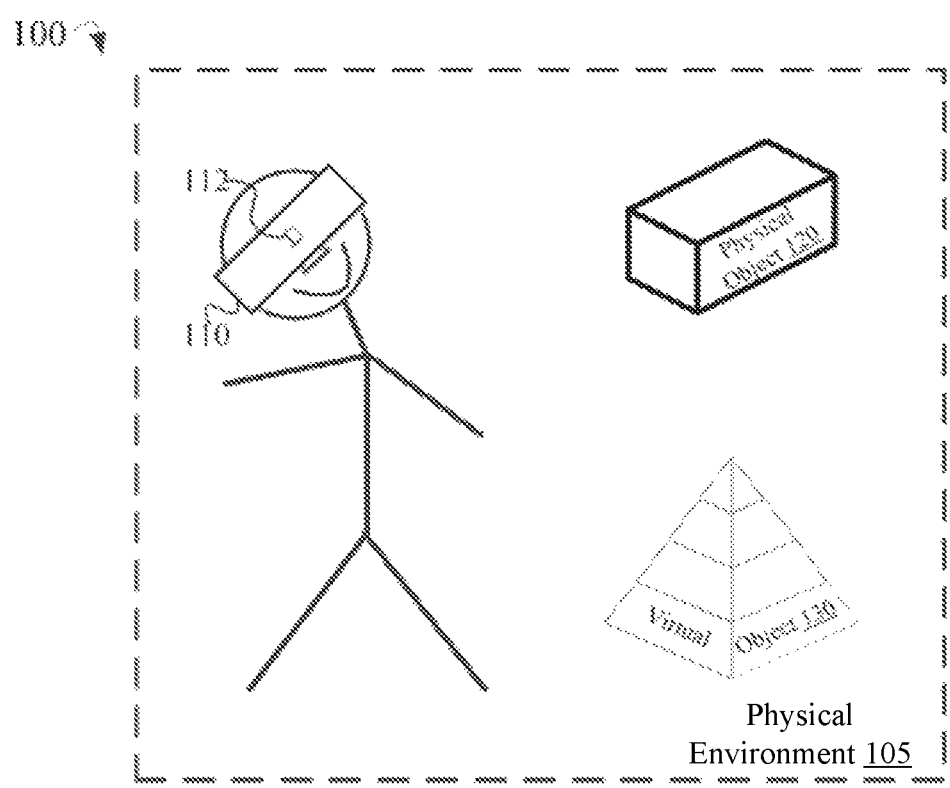
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present invention is illustrated and designated generally 100. In general, operating environment 100 illustrates an electronic device 110 configured to present a user with a computer generated reality ("CGR") experience. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense or interact with a CGR object using any one of their senses, including sight, sound, touch, taste, and smell. For example, a person may sense or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense or interact with virtual objects in the VR environment through a simulation of the person's presence within the computer-generated environment, or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As used herein, "sensory content" or "content" generally refers to attributes or characteristic of an external stimuli in a physical environment that is perceivable by one or more sensory organs of a user. Examples of "sensory content" or "content" include auditory content, visual content, tactile content, olfactory content, gustatory content, or combinations thereof.

"Sensory content" or "content" may be distinguishable on the basis of where it originates. For example, natural/physical sensory content may originate from a physical environment 105 proximate to electronic device 110. As such, physical sensory content is perceivable by a user with or without electronic device 110. In contrast, virtual sensory content refers to sensory content that is generated or at least processed by a computing device (e.g., electronic device 110). Virtual sensory content may include two-dimensional ("2D") and/or three-dimensional ("3D") graphical/image content, sounds, tactile feedback, and the like, which is generated or at least processed by a computing device. As such, virtual sensory content is not perceivable by a user without a computing device.

To present a user with a CGR experience, physical sensory content corresponding to a physical environment 105 proximate to electronic device 110 is replaced with virtual sensory content. The CGR experience may be a fully immersive experience. For example, to present a user with a CGR experience based on visual sensory content, only visual sensory content corresponding to a VR environment may be presented on a display of electronic device 110. If the VR environment represents a futuristic world populated with robots, only visual sensory content corresponding to that futuristic world would be presented on the display of electronic device 110. In this example, if physical object 120 is a family cat and virtual object 130 is a particular robot from the futuristic world, only visual sensory content corresponding to the robot (i.e., virtual object 130) would be presented on the display of electronic device 110, as part of the VR experience. As such, in the CGR experience of this example, the robot and associated virtual sensory content (e.g., images of spaceships and aliens from the futuristic world) would replace the family cat and other physical sensory content associated with physical environment 105 (e.g., images of a recliner and a lamp) in a field of view of the user.

To present a user with an AR experience, physical sensory content corresponding to a physical environment proximate to electronic device 110 (e.g., physical environment 105) may be supplemented with virtual sensory content. As part of the AR experience, the physical environment may provide a reference framework into which the virtual sensory content is introduced. Continuing with the example above, physical sensory content corresponding to the family cat and virtual sensory content corresponding to the robot would both be presented on the display of electronic device 110, as part of the AR experience. As such, in the AR experience of this example, at least a subset of visual sensory content corresponding to the futuristic world (e.g., the robot) would coexist with at least a subset of visual sensory content corresponding to physical environment 105 (e.g., the family cat) in a field of view of the user.

In an implementation, elements of a physical environment 105 proximate to electronic device 110 (e.g., physical object 120) interact with elements of a CGR environment (e.g., virtual object 130) during an AR experience. In this implementation using the example above, a user may perceive the family cat running away from the robot (or vice versa), as part of the AR experience. In an implementation, elements of a physical environment 105 proximate to electronic device 110 may not interact with elements of a CGR environment during an AR experience. In this implementation using the example above, a user may not perceive any interaction between the family cat and the robot.

In another example, to present a user with an CGR experience, physical sensory content corresponding to a physical environment 105 proximate to electronic device 110 may be again supplemented with virtual sensory content. Continuing with the example above, physical sensory content corresponding to the family cat and virtual sensory content corresponding to the robot would both be presented on the display of electronic device 110, as part of the CGR experience. As such, in the CGR experience of this example, at least a subset of visual sensory content corresponding to the futuristic world (e.g., the robot) would again coexist with at least a subset of visual sensory content corresponding to physical environment 105 (e.g., the family cat) in a field of view of the user.

Moreover, as part of the experience, the user may interact with both virtual objects in the futuristic world and physical objects in physical environment 105 using physical objects from physical environment 105 that are unassociated with electronic device 110. Using the example above, if the user picks up a laser pointer from an end table adjacent to the recliner and projects a laser beam on a nearby wall, the family cat and the robot may both follow that laser beam. That laser beam may both reflect off a mirror hanging on the nearby wall and shoot down a passing spaceship from the futuristic world during the experience. In that respect, virtual sensory content may be intertwined with physical sensory content corresponding to a physical environment proximate to electronic device 110, as part of the experience.

Electronic device 110 is shown as a head-mounted device ("HMD") in the example depicted by FIG. 1. Those skilled in the art will recognize that an HMD is but one form factor that is suitable for implementing electronic device 110. Other form factors that are suitable for implementing electronic device 110 include smartphones, AR glasses, smart glasses, desktop computers, laptops, tablets, computing devices, and the like. In some implementations, electronic device 110 includes a suitable combination of software, firmware, and/or hardware.

Figure 2:
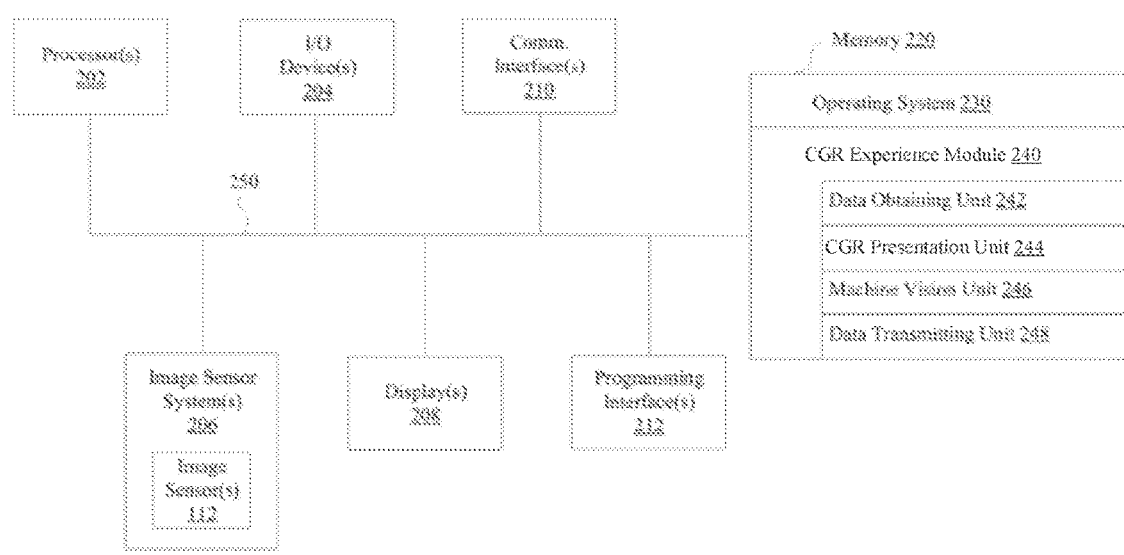
FIG. 2 is a block diagram of an example electronic device that is suitable for implementing aspects of the present invention.

For example, electronic device 110 may include image sensor 112 and an output device (e.g., display 208 of FIG. 2). Examples of suitable devices for implementing the output device include a display, an audio speaker, a haptic device, and the like. In one implementation, electronic device 110 includes an output device disposed on an inward facing surface of electronic device 110.

Image sensor 112 is configured to obtain image data corresponding to a physical environment 105 in which electronic device 110 is located. In one implementation, image sensor 112 is part of an array of image sensors configured to capture light field images corresponding to the physical environment 105. In one implementation, image sensor 112 is a component of a depth camera.

Some implementations describe virtual sensory content and physical sensory content in terms of visual sensory content. However, implementations are not limited to visual sensory content, but rather may include any type of sensory content described above with respect to FIG. 1 when an electronic device includes appropriate sensors and output devices. For example, aspects of the present invention are equally applicable to auditory content when an electronic device includes appropriate sensors and output devices, such as a microphone and speaker, respectively.

FIG. 2 is a block diagram of an example electronic device 110 that is suitable for implementing aspects of the present invention. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations electronic device 110 includes one or more processors 202 (e.g., microprocessors, ASICs, FPGAs, GPUs, CPUs, processing cores, and/or the like), one or more I/O devices 204, one or more interior and/or exterior facing image sensor systems 206, one or more displays 208, one or more communication interfaces 210 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, and/or the like type interface), one or more programming (e.g., I/O) interfaces 212, a memory 220, and one or more communication buses 250 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 204 are configured to provide a human to machine interface exchanging commands, requests, information, data, and the like, between electronic device 110 and a user. The one or more I/O devices 204 can include, but are not limited to, a keyboard, a pointing device, a microphone, a joystick, and the like.

In one implementation, the one or more I/O devices 204 include an input device that is configured to transition between a plurality of display modes based on movement of the input device. In one implementation, the plurality of display modes include a first display mode in which content representing a CGR environment lacks any visual representations corresponding to physical objects in a physical environment. In one implementation, the plurality of display modes include a second display mode in which content representing a CGR environment comprises visual representations of physical objects that are within a threshold proximity of electronic device 110. In one implementation, the plurality of display modes include a third display mode in which the content representing a CGR environment comprises visual representations for each physical object included in content representing a physical environment in which electronic device 110 is located without regard to proximity with electronic device 110.

The one or more image sensor systems 206 comprise an image sensor (e.g., image sensor 112) configured to obtain content representing a view corresponding to a physical environment in which electronic device 110 is located ("physical content"). In one implementation, image sensor 112 is part of an array of image sensors configured to capture light field images corresponding to a physical environment in which electronic device 200 is located. In one implementation, image sensor 112 is disposed on an exterior surface of electronic device 110. Examples of suitable image sensors for effectuating image sensors of the one or more image sensor systems 206 may include one or more RGB camera (e.g., with a complimentary metal-oxide-semiconductor ("CMOS") image sensor or a charge-coupled device ("CCD") image sensor), monochrome camera, IR camera, event-based camera, and/or the like.

In some implementations, the one or more image sensor systems 206 are configured to obtain image data that corresponds to at least a portion of the face of the user that includes the eyes of the user. In various implementations, the one or more image sensor systems 206 further include illumination sources that emit light upon the portion of the face of the user, such as a flash or a glint source.

In some implementations, the one or more displays 208 are configured to present content, as described below in greater detail, to the user. In some implementations, the one or more displays 208 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), and/or the like display types. In some implementations, the one or more 208 correspond to diffractive, reflective, polarized, holographic, etc. waveguide displays. In some implementations, the one or more displays 208 are capable of presenting any combination of physical content and virtual content.

In one implementation, the one or more displays 208 includes a display device comprising a plurality of pixels and is configured to present content comprising image data obtained using image sensor 112. Each pixel among the plurality of pixels may be implemented using light-emitting diodes (LEDs), organic light-emitting diodes (OLEDs), plasma cells, liquid crystal display (LCD) components, and the like. In one implementation, the one or more displays 208 are disposed on an inward facing surface of electronic device 110. In one implementation, the one or more displays 208 are a see-through display through which a portion of the physical environment is visible.

In one implementation, the one or more displays 208 include a stereoscopic image display for presenting left-eye and right-eye view points. In one implementation, the stereoscopic image display presents a stereoscopic subset of a 3D representation of a scene corresponding to a physical environment (e.g., physical environment 105 of FIG. 1) in which electronic device 110 is located. In one implementation, the 3D representation of the scene is reconstructed using light field images captured by an array of image sensors included in image sensor system 206.

In one implementation, the one or more displays 208 are configured to visually distinguish between physical objects in a physical environment and virtual objects in a CGR environment in response to detecting an interaction with the one or more I/O devices 204. In one implementation, the one or more displays 208 are configured to visually distinguish between the physical objects and the virtual objects when the physical objects are within a threshold proximity of electronic device 110 based on movement of the one or more I/O devices 204.

The one or more communication interfaces 210 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

The one or more programming (e.g., I/O) interfaces 212 are configured to communicatively couple the one or more I/O devices with other components of electronic device 110. As such, the one or more programming interfaces 212 are capable of accepting commands or input from a user via the one or more I/O devices 204 and transmitting the entered input to the one or more processors 202.

The memory 220 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 220 may include high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. Instructions stored in the memory 220 may be executed by the one or more processors 202 to perform a variety of methods and operations, including the technique for enriching locally-sourced image data described in greater detail below.

In some implementations, the memory 220 or the non-transitory computer readable storage medium of the memory 220 stores the following programs, modules and data structures, or a subset thereof including an optional operating system 230 and a CGR experience module 240. The operating system 230 includes procedures for handling various basic system services and for performing hardware dependent tasks. In some implementations, the CGR experience module 240 is configured to generate CGR experiences based on physical environment geometries for presentation to a user via the one or more displays 208. To that end, in various implementations, the CGR experience module 240 includes a data obtaining unit 242, an CGR presentation unit 244, a machine vision unit 246, and a data transmitting unit 248.

In some implementations, the data obtaining unit 242 is configured to obtain data (e.g., presentation data, interaction data, sensor data, location data, etc.) from one or more computing devices external to electronic device 110. To that end, in various implementations, the data obtaining unit 242 includes instructions and/or logic therefor, and heuristics and metadata therefor.

In some implementations, the CGR presentation unit 244 is configured to generate content representing a CGR environment using physical environment geometries of a physical environment or scene depicted in image data generated by image sensor system 206 for presentation on the one or more displays 208. To that end, in various implementations, the CGR presentation unit 244 includes instructions and/or logic therefor, and heuristics and metadata therefor.

In some implementations, the machine vision unit 246 is configured to perform various image processing techniques (e.g., classification, feature extraction, multi-scale signal analysis, pattern recognition, projection, and the like) on image data received from an image sensor of image sensor system 206. To that end, in various implementations, the machine vision unit 246 includes instructions and/or logic therefor, and heuristics and metadata therefor.

In some implementations, the data transmitting unit 248 is configured to transmit data (e.g., presentation data, location data, etc.) to one or more computing devices external to electronic device 110. To that end, in various implementations, the data transmitting unit 248 includes instructions and/or logic therefor, and heuristics and metadata therefor.

Although the data obtaining unit 242, the CGR presentation unit 244, the machine vision unit 246, and the data transmitting unit 248 are shown as residing on a single device (e.g., electronic device 110), it should be understood that in other implementations, any combination of the data obtaining unit 242, the CGR presentation unit 244, the machine vision unit 246, and the data transmitting unit 248 may be located in separate computing devices.

FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

One existing technique of generating CGR experiences utilizes pre-canned (or fixed) content to represent a particular VR environment. When presented on a display of an electronic device that pre-canned content provides the same CGR experience regardless of where the electronic device is physically located. For example, a CGR experience generated by an electronic device based on such pre-canned content may remain unchanged regardless of whether the electronic device is located in a first physical environment or a second physical environment that each have a distinct physical environment geometry.

As used herein, "physical environment geometry" refers to physical parameters of physical boundaries defining a physical environment in which an electronic device and any physical objects populating the physical environment in addition to spatial locations of such physical boundaries and physical objects relative to the electronic device. In describing the present invention, "physical boundary" and "physical object" may be used interchangeably. A physical object may include one or more physical features (e.g., an edge feature, a surface feature, a corner feature, a ridge feature, a blob feature (or region of interest feature), and the like).

A "physical feature" is a portion of a physical object that distinguishes that physical object from other physical objects in a proximate physical environment and the proximate physical environment itself. Each physical feature includes one or more "physical parameters" that represent particular attributes or characteristics that describe a corresponding physical feature. Examples of physical parameters include: a physical dimension parameter, a shadow parameter, a color parameter, a texture parameter, an occlusion parameter, a reflective parameter, a refractive parameter, and the like.

A "physical dimension parameter" is a dimensional attribute (e.g., height, length, width) of a corresponding physical feature. A "shadow parameter" is a characteristic that describes whether a corresponding physical feature is capable of receiving a shadow when an opaque object intervenes between a light source and the corresponding physical feature. A "color parameter" is a color attribute of a corresponding physical feature that is described using a color value output by a color model (e.g., RGB color model, CMYK color model, etc.) for the corresponding physical feature. A "texture parameter" is a tactile surface characteristic of a corresponding physical feature. An "occlusion parameter" is an opacity attribute of a corresponding physical feature that characterizes an extent to which the corresponding physical feature blocks light transmissions emitted by a light source. A "reflective parameter" is a characteristic that describes whether a corresponding physical feature is capable of returning optical, thermal, and/or acoustic energy incident upon the corresponding physical feature without absorbing that energy. A "refractive parameter" is a characteristic that describes how a transmission path of optical energy changes as the optical energy propagates through a corresponding physical feature.

Instead of generating CGR experiences using pre-canned content, as discussed above, implementations dynamically generate CGR experiences based on physical environment geometries. As such, a CGR experience generated by an electronic device would change based on whether the electronic device is located in the first physical environment or the second physical environment in the previous example. Specifically, as described in greater detail below, the electronic device would generate a first version of a CGR experience based on the first physical environment geometry when located in the first physical environment and a second version of the CGR experience (distinct from the first version of the CGR experience) based on the second physical environment geometry when located in the second physical environment.

One aspect of dynamically generating CGR experiences based on physical environment geometries may involve feature descriptors. Each feature descriptor corresponds to a physical parameter of a physical feature of a physical object in a physical environment. As used herein, "feature descriptors" are one or more values (e.g., alphabetic values, numeric values, alphanumeric values, Boolean values, etc.) that define a corresponding physical parameter of a physical feature. The one or more values are included in a set of possible values that may define a corresponding physical parameter. In one implementation, a feature descriptor is output by machine vision unit 246 for a corresponding physical parameter upon receiving image data from an image sensor (e.g., image sensor 112) of electronic device 110 at an input. In one implementation, a feature descriptor defined for a corresponding physical parameter is used by machine vision unit 246 to recognize, identify, and/or classify a physical feature associated with the corresponding physical parameter.

By way of example, a physical object may correspond to the mirror hanging on the nearby wall in the example discussed above with reference to FIG. 1. In this example, a physical feature may correspond to the reflective surface of that mirror. A feature descriptor for a texture parameter of that reflective surface may define an alphanumeric value that characterizes that reflective surface as having a smooth texture. A feature descriptor for a reflective parameter of that reflective surface may define a Boolean value (e.g., true) that indicates that reflective surface is capable of returning optical energy that is incident upon it without absorbing that energy.

As another example, a physical object may correspond to the end table from which the user picks up the laser pointer in the example discussed above with reference to FIG. 1. In this example, a physical feature may correspond to a corner of that end table's upper surface on which the laser pointer rests. A feature descriptor for a color parameter of that corner may define an alphabetic value that characterizes that corner as being "dark brown". A feature descriptor for an occlusion parameter of that corner may define a numeric value that characterizes the corner as blocking 100% of light transmissions emitted by a light source.

Figure 3:
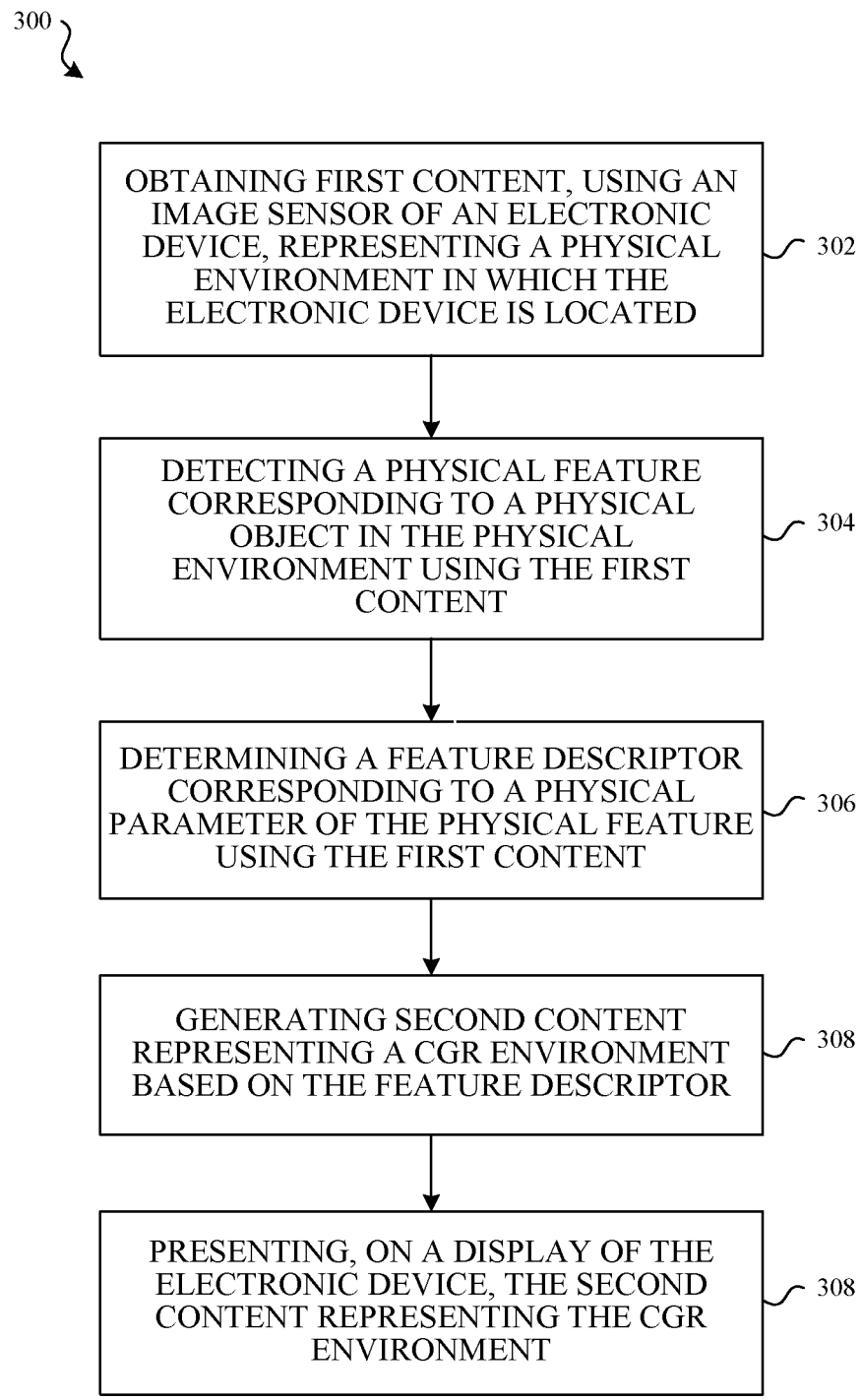
FIG. 3 is a flow-chart illustrating an example of a method for dynamically generating CGR experiences based on physical environment geometries.

FIG. 3 is a flow-chart illustrating an example of a method 300 for dynamically generating CGR experiences based on physical environment geometries. At block 302, method 300 includes obtaining first content representing a physical environment in which an electronic device is located using an image sensor of the electronic device. In one implementation, the first content is a video of the physical environment comprising a sequence of images of the physical environment. At block 304, method 300 includes detecting a physical feature corresponding to a physical object of the physical environment using the first content.

At block 306, method 300 includes determining a feature descriptor corresponding to a physical parameter of the physical feature using the first content. In one implementation, machine vision unit 246 determines the feature descriptor for the corresponding physical parameter upon receiving image data from the image sensor at an input. At block 308, method 300 includes generating second content representing a CGR environment based on the feature descriptor. At block 310, method 300 includes presenting the second content representing the CGR environment on a display of the electronic device.

Figure 4:
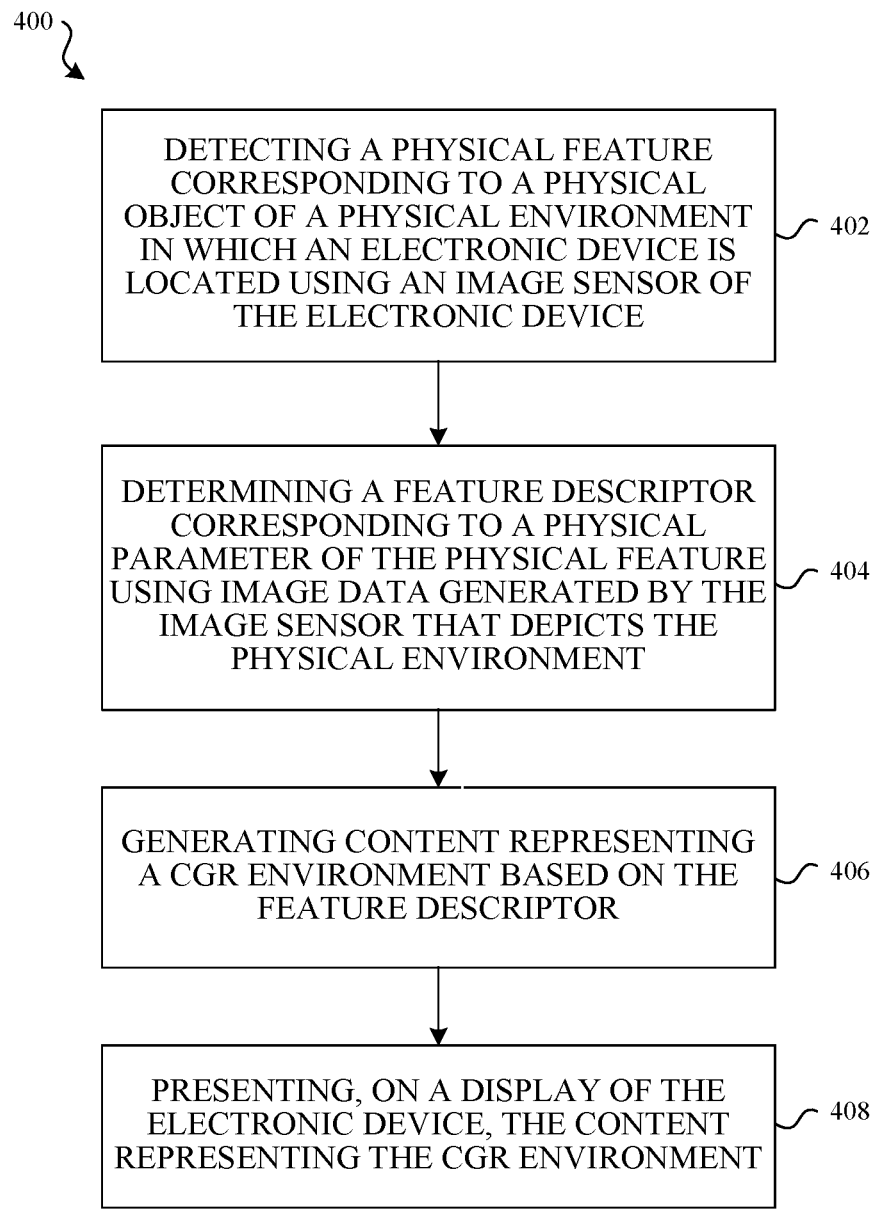
FIG. 4 is a flow-chart illustrating another example of a method for dynamically generating CGR experiences based on physical environment geometries.

FIG. 4 is a flow-chart illustrating another example of a method 400 for dynamically generating CGR experiences based on physical environment geometries. At block 402, method 400 includes detecting a physical feature corresponding to a physical object of a physical environment in which an electronic device is located using an image sensor of the electronic device. At block 404, method 400 includes determining a feature descriptor corresponding to a physical parameter of the physical feature using image data generated by the image sensor that depicts the physical environment. In one implementation, machine vision unit 246 determines the feature descriptor using image data received from image sensor system 206. At block 406, method 400 includes generating content representing a CGR environment based on the feature descriptor. At block 408, method 400 includes presenting the second content representing the CGR environment on a display of the electronic device. In one implementation, the display is a see-through display with a portion of the physical environment being visible through the see-through display. In one implementation, the display is a display device comprising a plurality of pixels.

In one implementation, method 300 and/or method 400 is performed by processing logic, including hardware, firmware, software, or a combination thereof. In one implementation, method 300 and/or method 400 is performed by a processor executing code stored in a non-transitory computer-readable medium (e.g., a memory).

In some implementations, generating content representing a CGR environment involves a virtual environment library. In one implementation, the virtual environment library includes a plurality of virtual features that are indexed within the virtual environment library based on corresponding feature descriptors. In one implementation, generating content representing a CGR environment involves selecting a virtual feature based on a feature descriptor of a physical feature. In one implementation, the virtual feature is positioned in the CGR environment to substantially or fully align with a position of the physical feature in the physical environment relative to the electronic device. In one implementation, the virtual feature (e.g., virtual features 622-626 and 822-826 of FIGS. 6 and 8, respectively) represents a peripheral boundary of the physical object in the CGR environment.

In one implementation, an object type of a physical object is unknown when a physical feature corresponding to the physical object is detected. In one implementation, detecting a physical feature corresponding a physical object involves segmenting image data generated by an image sensor of the electronic device that depicts a physical environment including the physical object. In one implementation, the object type of the physical object is estimated using a feature descriptor corresponding to a physical parameter of the physical feature and an image sensor.

In one implementation, a virtual environment library includes multiple virtual objects that are indexed within the virtual environment library based on corresponding feature descriptors. In one implementation, generating content representing a CGR environment involves selecting a virtual object in the virtual environment library for the physical object based on an estimated object type. In one implementation, the virtual object is positioned in the CGR environment to substantially or fully align with a respective position of the physical object in the physical environment relative to the electronic device. In one implementation, the image sensor is a component of the electronic device that detects the physical feature. In one implementation, the image sensor is a component of computing device that is external to the electronic device that detects the physical feature.

In some implementations, generating content representing a CGR environment involves pre-defined replacement rules that define a theme of the CGR environment. For example, a theme of the CGR environment representing the futuristic world populated with robots discussed above with reference to FIG. 1 may be characterized as a robotic theme. Examples of other themes that the pre-defined replacement rules may define as the theme of the CGR environment include, but are not limited to: a medieval theme, a pirate theme, an underwater theme, and the like.

In one implementation, generating content representing a CGR environment involves overlaying a region of a display corresponding to a physical object in accordance with the predefined replacement rules. In one implementation, generating content representing a CGR environment involves locating a visual representation of the physical object in the region of the display corresponding to the physical object based, in part, on an evaluation of a feature descriptor (corresponding to a physical parameter of a physical feature of the physical object) with the predefined replacement rules.

In one implementation, the visual representation of the physical object is a virtual object (e.g., virtual objects 610 and 810 of FIGS. 6 and 8, respectively) when the evaluation of the feature descriptor with the predefined replacement rules determines that positioning the virtual object in the region of the display corresponding to the physical object comports with the theme of the CGR environment. In one implementation, the visual representation of the physical object is a wireframe representation of the physical object (e.g., wireframe representations 630 and 830 of FIGS. 6 and 8, respectively) when the evaluation of the feature descriptor with the predefined replacement rules determines that positioning a virtual object in the region of the display corresponding to the physical object does not comport with the theme of the CGR environment.

In one implementation, method 300 and/or method 400 further includes approximating a physical layout corresponding to an area of the physical environment proximate to the electronic device using the image sensor. In one implementation, method 300 and/or method 400 further includes defining a virtual layout of the CGR environment based, at least in part, on the physical layout of the physical environment.

In one implementation, method 300 and/or method 400 further includes presenting a visual representation associated with a physical feature on the display in response to detecting that the physical feature is within a threshold distance of the electronic device using an image sensor of the electronic device. In one implementation, method 300 and/or method 400 further includes generating an alert regarding the physical feature for presentation on an output device (e.g., display 208 of FIG. 2) of the electronic device. In one implementation, the alert includes auditory content, visual content, tactile content, olfactory content, gustatory content, or a combination thereof.

Figure 5:
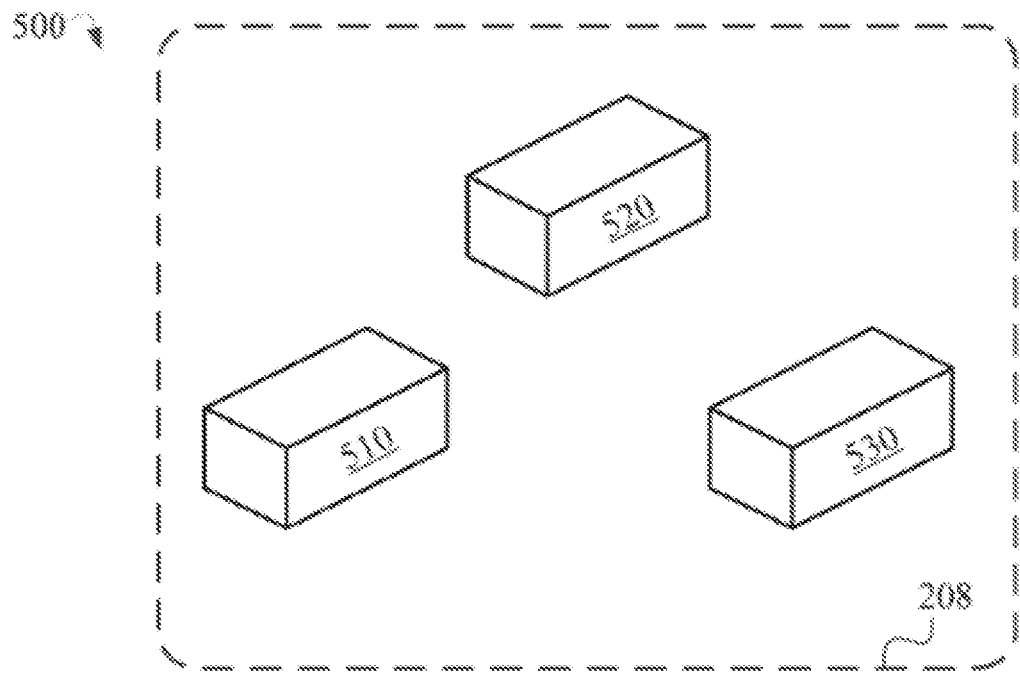
FIG. 5 illustrates an example of a display of an electronic device presenting content corresponding to a first physical environment in which the electronic device is located.
Figure 6:
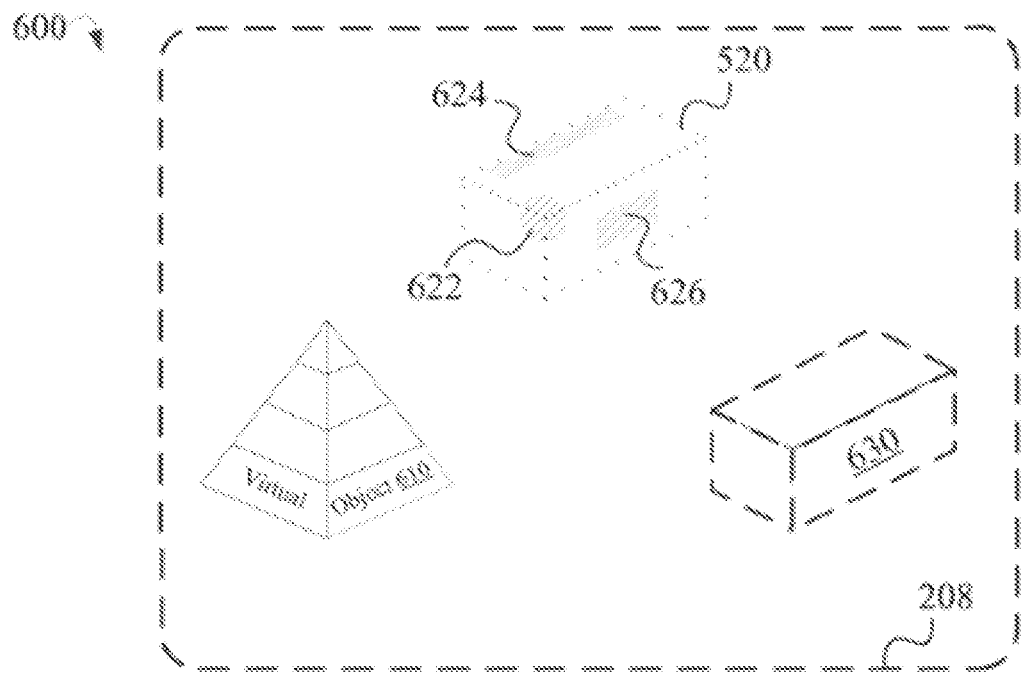
FIG. 6 illustrates an example of a display of the electronic device presenting content representing a CGR environment while located at the first physical environment illustrated in FIG. 5.

FIGS. 5-6 are examples of display 208 presenting content corresponding to a view 500 of a first physical environment in which electronic device 110 is located and content representing a view 600 of a CGR environment while located at the first physical environment, respectively. The content corresponding to the view 500 of the first physical environment is obtained using an image sensor (e.g., image sensor 112) of electronic device 110. A first physical environment geometry of the first physical environment illustrated in view 500 is defined, in part, by physical objects 510, 520, and 530. By way of example, in view 500, the first physical environment may represent a living room, physical object 510 may represent a couch, physical object 520 may represent a coffee table, and physical object 530 may represent a recliner. Based on the first physical environment geometry illustrated in view 500, CGR presentation unit 244 generates the content representing the view 600 of the CGR environment.

A comparison between the FIGS. 5 and 6 illustrates that a virtual layout of a CGR environment may be comparable to a physical layout of a physical environment proximate to electronic device 110. For example, an arrangement of physical objects 510, 520, and 530 in view 500 is comparable to an arrangement of virtual visual sensory content (i.e., virtual object 610, virtual features 622-626, and wire frame representation 630) in the view 600 of the CGR environment. In one implementation, machine vision unit 226 approximates a physical layout corresponding to an area (e.g., the area depicted in view 500) of a physical environment proximate to electronic device 110 using image sensor 112. In FIG. 5, that physical layout is represented by the arrangement of physical objects 510, 520, and 530 in view 500. In this implementation, CGR presentation unit 244 defines a virtual layout of a CGR environment based, at least in part, on the physical layout. In FIG. 5, that virtual layout is represented by the arrangement of virtual visual sensory content in the view 600 of the CGR environment.

View 600 illustrates three ways that content representing a CGR environment may be generated based on physical environment geometries. One such way that content representing CGR environment may be generated is illustrated with virtual object 610. Continuing with the example above in which the first physical environment is a living room, machine vision unit 246 may detect a physical feature of the couch while electronic device 110 is located in the living room using the content representing view 500. In one implementation, detecting a physical feature corresponding to a physical object includes segmenting image data generated by an image sensor of the electronic device that depicts a physical environment including the physical object. In this example, the physical feature of the couch may correspond to a bottom edge of the couch that extends an entire length of the couch between opposing ends of the couch. Machine vision unit 246 may determine a feature descriptor for a physical dimension parameter of the bottom edge of the couch that defines a length of the bottom edge of the couch. For example, the feature descriptor may define the length of the bottom edge of the couch as being approximately 8 feet long.

In the example of FIG. 6, predefined replacement rules may define a theme of CGR environment illustrated in view 600. To generate the content representing the CGR environment illustrated in view 600, CGR presentation unit 244 overlays a region of display 208 corresponding to the couch in accordance with the predefined replacement rules. Overlaying that region of display 208 involves CGR presentation unit 244 evaluating the feature descriptor for the physical dimension parameter of the bottom edge of the couch that machine vision unit 246 determined with the predefined replacement rules.

Through that evaluation, CGR presentation unit 244 determined that positioning a virtual object in the region of display 208 corresponding to the couch comports with the theme of the CGR environment. In one implementation, upon determining that positioning a virtual object in that region of display 208 comports with the theme of the CGR environment, CGR presentation unit 244 selects virtual object 610 from a virtual environment library using the corresponding feature descriptor. CGR presentation unit 244 also determines through evaluating the corresponding feature descriptor with the predefined replacement rules where to locate virtual object 610 when presenting the content representing the CGR environment on display 208.

As discussed above, an object type of a physical object may be unknown when a physical feature corresponding to the physical object is detected. Therefore, machine vision unit 246 may not have identified an object type of the couch when the bottom edge of the couch is detected. In that instance, machine vision unit 246 estimates the object type of the couch using the feature descriptor for the physical dimension parameter of the bottom edge of the couch and image sensor 112. To generate the content representing the CGR environment illustrated in view 600, CGR presentation unit 244 may select virtual object 610 in a virtual object library for the couch based on the object type that machine vision unit 246 estimated.

Another way that content representing a CGR environment may be generated is illustrated with virtual features 622, 624, and 626. Continuing with the example above in which the first physical environment is a living room, machine vision unit 246 may detect a physical feature of the coffee table while electronic device 110 is located in the living room using the content representing view 500. As seen in FIG. 6, a virtual feature (e.g., virtual features 622, 624, and 626) may represent a peripheral boundary of a physical object (e.g., the coffee table) in the CGR environment. In this example, the physical feature of the coffee table may correspond to an upper corner of the coffee table associated with virtual feature 622 in view 600. Machine vision unit 246 may determine a feature descriptor for a physical dimension parameter of the bottom edge of the couch that defines a height of the upper corner relative to a floor of the first physical environment. For example, the feature descriptor may define the length of the height of the upper corner as being approximately 2 feet above the floor.

In one implementation, generating the content representing the CGR environment illustrated in view 600 involves CGR presentation unit 244 selecting virtual feature 622 in a virtual object library for the upper corner of the coffee table (i.e., physical object 520). CGR presentation unit 244 selects virtual feature 622 based on the feature descriptor for the physical dimension parameter of the upper corner of the coffee table that machine vision unit 246 determined. CGR presentation unit 244 then positions virtual feature 622 to substantially or fully align with a respective position of the upper corner of the coffee table in the physical environment relative to the electronic device, as seen in FIG. 6.

In one implementation, machine vision unit 246 may detect that a surface of the coffee table perpendicular to the floor of the physical environment associated with virtual feature 624 is within a threshold distance of electronic device 110 using image sensor 112. Responsive to machine vision unit 246 detecting that this surface of the coffee table is within the threshold distance of electronic device 110, CGR presentation unit 244 presents a visual representation associated with that surface of the coffee table on display 208. In this instance, the visual representation associated with that surface of the coffee table corresponds to virtual feature 624. In one implementation, CGR presentation unit 244 selects virtual feature 624 based on a feature descriptor for a physical parameter of the surface of the coffee table that machine vision unit 246 determined.

In one implementation, responsive to machine vision unit 246 detecting that the surface of the coffee table is within the threshold distance of electronic device 110, CGR experience module 240 may generate an alert regarding the surface of the coffee table for presentation on an output device of electronic device 110. For example, CGR experience module 240 may generate auditory content to warn a user of electronic device 110 that the surface of the coffee table is at an unsafe distance from electronic device 110. As another example, CGR presentation unit 244 may generate visual content (e.g., a flashing visual indicator for presentation on display 208) to warn a user of electronic device 110 that the surface of the coffee table is at an unsafe distance from electronic device 110. In accordance with implementations, the alert may include auditory content, visual content, tactile content, olfactory content, gustatory content, or a combination thereof.

As discussed above with reference to virtual object 610, predefined replacement rules may define a theme of the CGR environment illustrated in view 600. To generate the content representing the CGR environment illustrated in view 600, CGR presentation unit 244 overlays a region of display 208 corresponding to the recliner (i.e., physical object 530) in accordance with those predefined replacement rules. Overlaying that region of display 208 involves machine vision unit 246 determining a feature descriptor for a physical parameter of physical feature of the recliner. CGR presentation unit 244 evaluates that feature descriptor with the predefined replacement rules. Through that evaluation, CGR presentation unit 244 determined that positioning a virtual object in the region of display 208 corresponding to the couch does not comport with the theme of the CGR environment.

In one implementation, upon determining that positioning a virtual object in that region of display 208 does not comport with the theme of the CGR environment, CGR presentation unit 244 generates wire frame representation 630 as a visual representation of the recliner in the CGR environment. CGR presentation unit 244 also determines through evaluating the corresponding feature descriptor with the predefined replacement rules where to locate wire frame representation 630 when presenting the content representing the CGR environment on display 208.

Figure 7:
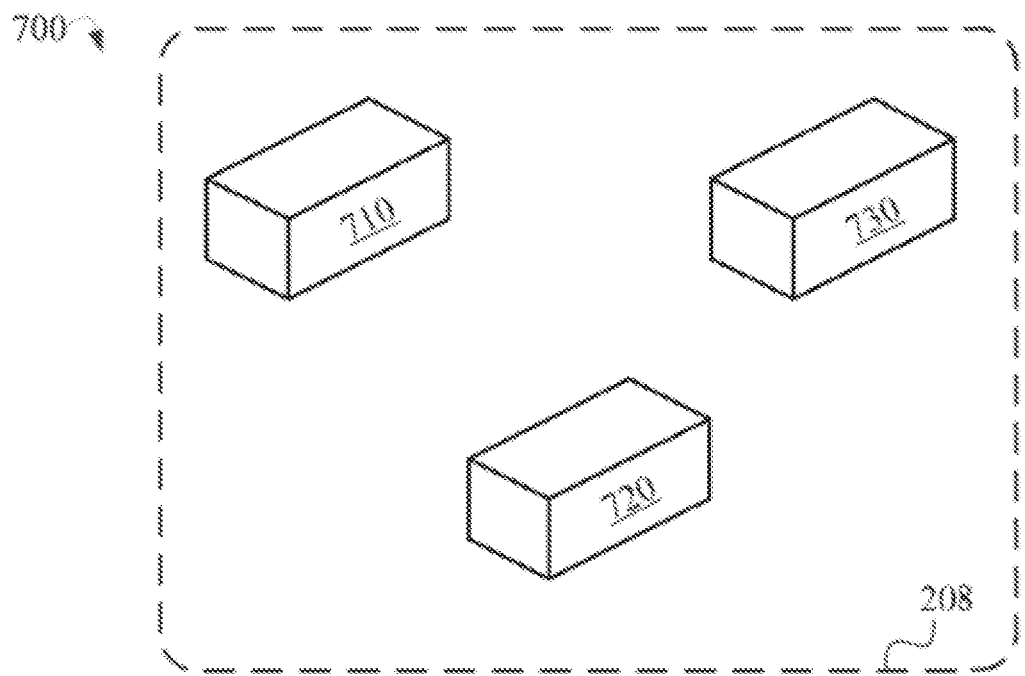
FIG. 7 illustrates an example of a display of an electronic device presenting content corresponding to a second physical environment in which the electronic device is located that is distinct from the first physical environment illustrated in FIG. 5.
Figure 8:
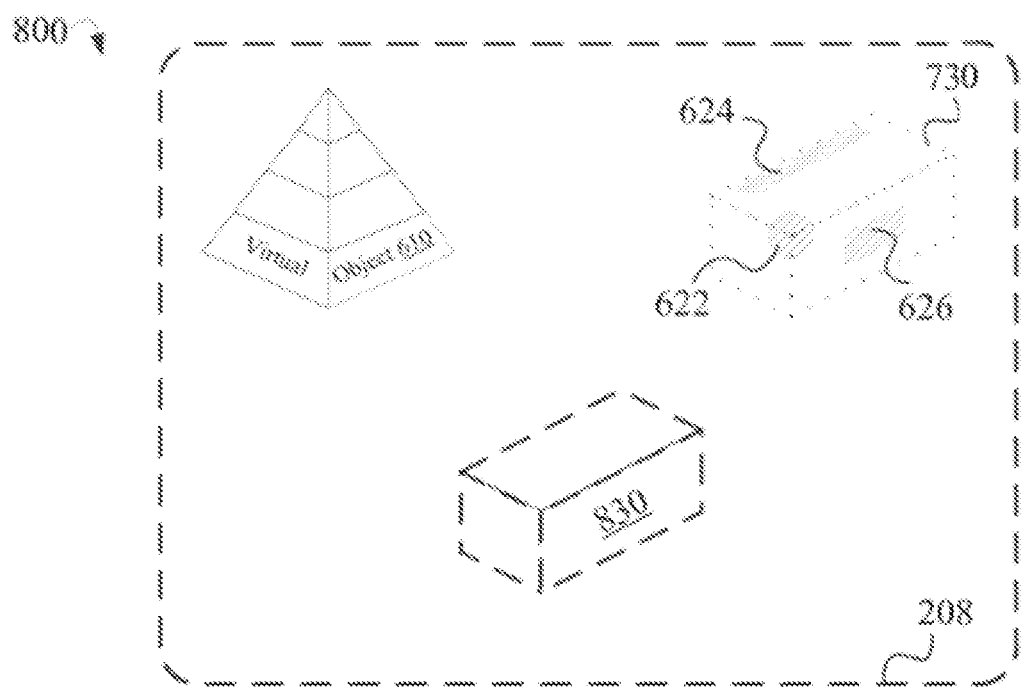
FIG. 8 illustrates an example of a display of the electronic device presenting content representing the CGR environment illustrated in FIG. 6 while located at the second physical environment illustrated in FIG. 7.

FIGS. 7-8 illustrate that, in contrast with existing techniques, implementations of the present invention may dynamically generate CGR experiences based on physical environment geometries. For example, view 500 of FIG. 5 and view 700 of FIG. 7 may represent the first and second physical environments discussed above with reference to FIG. 1. In this example, view 600 of FIG. 6 and view 800 of FIG. 8 represent first and second versions of the CGR experience discussed in the example above.

A comparison between the FIGS. 5 and 7 illustrates that physical environment geometries associated with the first and second physical environments represented in views 500 and 700, respectively, are noticeably different. As a result of that noticeable difference, the first and second versions of the CGR experience represented in views 600 and 800 of FIGS. 6 and 8, respectively, are likewise noticeably different. While each version is noticeably different, the CGR environments represented in views 600 and 800 are still distinct versions of the same CGR experience. For example, a comparison between the FIGS. 6 and 8 illustrates that virtual object 610 and virtual features 622-626 are present in each version of the CGR experience.

However, that comparison also illustrates that spatial locations of virtual object 610 and virtual features 622-626 change based on whether electronic device 110 is located in the first physical environment represented by view 500 or the second physical environment represented by view 700. For example, virtual object 610 is positioned in an upper region of display 208 when presenting view 600 whereas virtual object 610 is positioned in a lower region of display 208 when presenting view 800.

That comparison also illustrates that an arrangement of virtual object 610 and virtual features 622-626 changes based on whether electronic device 110 is located in the first physical environment represented by view 500 or the second physical environment represented by view 700. For example, virtual features 622-626 are positioned in a middle region of display 208 when presenting view 600 whereas virtual features 622-626 are positioned in an outer region of display 208 when presenting view 800. Such distinctions between these versions of the CGR experience correspond to the different physical environment geometries associated with the first and second physical environments represented in views 500 and 700, respectively.

By way of example, if physical object 710 in FIG. 7 represents a bed, machine vision unit 246 may detect a physical feature of the bed when electronic device is located in the second physical environment. Upon detecting that physical feature, machine vision unit 246 would determine a feature descriptor for a physical parameter of the physical feature of the bed. To generate the content representing the CGR environment illustrated in view 800, CGR presentation unit 244 overlays a region of display 208 corresponding to the bed in accordance with the predefined replacement rules. Through evaluating the feature descriptor associated with the bed, CGR presentation unit 244 determined that positioning a virtual object in the region of display 208 corresponding to the bed does comports with the theme of the CGR environment. In this example, upon determining that positioning a virtual object in that region of display 208 comports with the theme of the CGR environment, CGR presentation unit 244 selected virtual object 610 from a virtual environment library using the feature descriptor.

Another difference illustrated by the comparison between the FIGS. 6 and 8, is that wire frame representation 630 of FIG. 6 is not present in FIG. 8. Because CGR presentation unit 244 dynamically generates the second version of the CGR experience when electronic device 110 is located in the second physical environment of view 700, content representing physical object 530 from the first physical environment of view 500 would be unavailable. Instead, the second version of the CGR experience includes wire frame representation 820 that provides a visual representation of physical object 720 (e.g., a chest of drawers) in the second physical environment of view 700.

Figure 9:
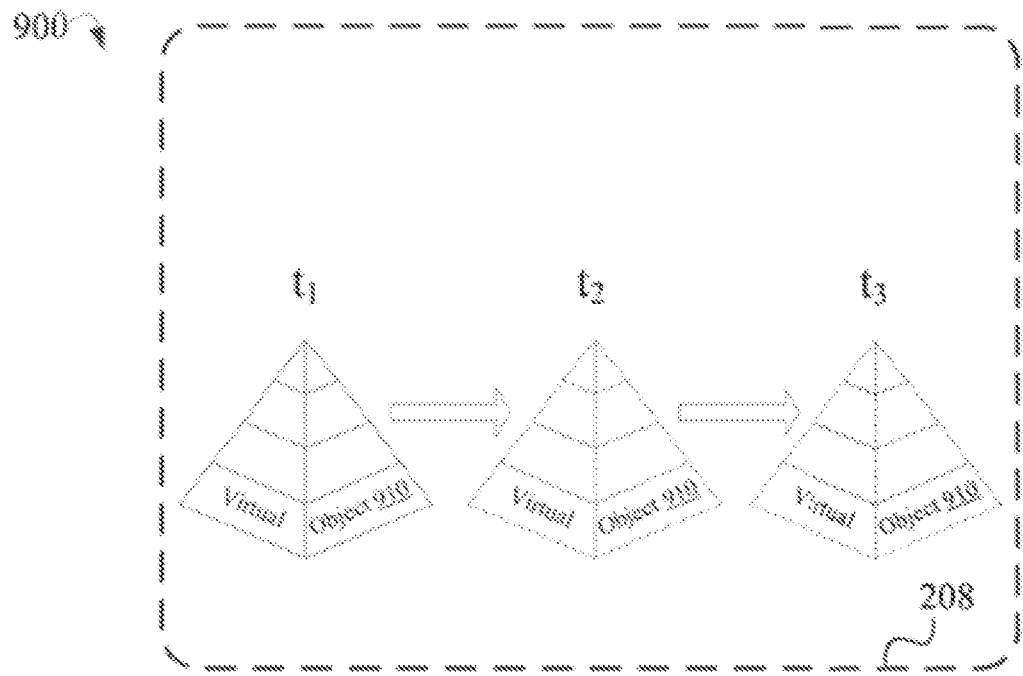
FIG. 9 illustrates an example of a display of an electronic device presenting a CGR experience with a moving virtual object having a traversal path without accounting for physical environment geometries proximate to the electronic device.
Figure 10:
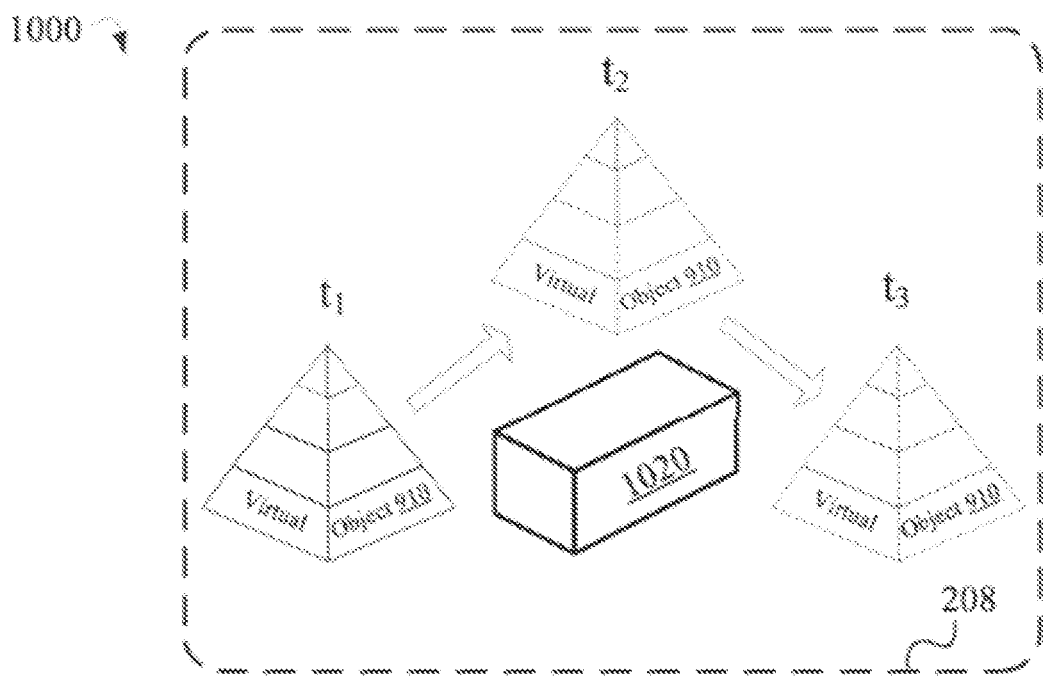
FIG. 10 illustrates an example of a display of an electronic device presenting the CGR experience illustrated in FIG. 9 while accounting for physical environment geometries proximate to the electronic device.

FIGS. 9-10 illustrate that dynamically generating CGR experiences based on physical environment geometries impacts both moving and non-moving virtual sensory content in a CGR environment. One such impact involves traversal paths of moving virtual sensory content, such as a traversal path followed by moving virtual object 910 from time "$t_1$" to time "$t_3$". When generating content representing view 900 of the CGR environment, machine vision unit 246 did not detect any physical features corresponding to physical objects in a physical environment that would impede the traversal path of moving virtual object 910 from time "$t_1$" to time "$t_3$". As a result, moving virtual object 910 follows a default traversal path from time "$t_1$" to time "$t_3$", which is represented as a straight line in view 900.

In contrast, when generating content representing view 1000 of the CGR environment, machine vision unit 246 detected a physical feature corresponding to physical object 1020 in a physical environment that would impede the traversal path of moving virtual object 910 from time "$t_1$" to time "$t_3$". As a result, moving virtual object 910 follows a modified traversal path from time "$t_1$" to time "$t_3$", which is represented by a divergence around physical object 1020 in view 1000. In one implementation, CGR presentation unit 244 defines a traversal path of a moving virtual object in a CGR environment based on collision geometry data. In one implementation, machine vision unit 246 determines the collision geometry data using an image sensor of electronic device 110. In one implementation, collision geometry data includes feature descriptor information generated by machine vision unit 246.

In accordance with some implementations, dynamically generating CGR experiences based on physical environment geometries may impact both moving and non-moving virtual sensory content in other ways. In one implementation, an interaction between virtual sensory content and a physical feature may be defined based on a feature descriptor corresponding to a physical parameter of the physical feature.

For example, the physical feature may correspond to the reflective surface of the mirror from the example above. In this example, CGR presentation unit 244 may present content on display 208 corresponding to a reflection of a virtual object on the reflective surface of the mirror based on the feature descriptor for the reflective parameter of that reflective surface. As another example, the physical feature may correspond to the corner of the end table's upper surface on which the laser pointer rests from the example above. In this example, CGR presentation unit 244 may present content on display 208 in which that corner of the end table occludes a portion of a virtual object based on the feature descriptor for the occlusion parameter of that corner of the end table.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions computer-executable on a computer to perform operations comprising:
   at an electronic device with a display and an image sensor:
   obtaining first content, using the image sensor, representing a physical environment in which the electronic device is located;
   detecting a physical feature corresponding to a physical object in the physical environment using the first content;
   generating second content representing a version of a computer-generated reality (CGR) environment based on the physical feature, the generating comprising positioning a virtual feature in the version of the CGR environment based on the physical feature, wherein the virtual feature is positioned differently in other versions of the CGR environment based on physical features of different physical objects in different physical environments having distinct physical environment geometries, the distinct physical environment geometries having different spatial locations of different physical boundaries and the different physical objects; and
   presenting, on the display, the second content representing the CGR environment.

2. The non-transitory computer-readable storage medium of claim 1, wherein generating the second content representing the CGR environment comprises:
   selecting a virtual feature based on the physical feature; and positioning the selected virtual element in the version of the CGR environment to align with a position of the physical feature in the physical environment relative to the electronic device.

3. The non-transitory computer-readable storage medium of claim 2, wherein the selected virtual element represents a peripheral boundary of the physical object in the version of the CGR environment.

4. The non-transitory computer-readable storage medium of claim 2, wherein the virtual feature is one of a plurality of virtual features indexed within a virtual environment library.

5. The non-transitory computer-readable storage medium of claim 1, wherein the physical feature is selected from a group comprising: an edge feature, a surface feature, and a corner feature.

6. The non-transitory computer-readable storage medium of claim 1, wherein the physical feature corresponds to a physical dimension parameter or a shadow parameter.

7. The non-transitory computer-readable storage medium of claim 1, wherein detecting the physical feature corresponding to the physical object comprises:
segmenting image data generated by the image sensor that depicts the physical environment.

8. The non-transitory computer-readable storage medium of claim 1, wherein the program instructions are computer-executable on the computer to perform operations comprising:
determining collision geometry data for the physical environment using the image sensor; and
defining a traversal path of a moving virtual object in the version of the CGR environment based on the collision geometry data.

9. The non-transitory computer-readable storage medium of claim 1, wherein an object type of the physical object is unknown when the physical feature is detected, and wherein the program instructions are computer-executable on the computer to perform operations comprising:
estimating the object type of the physical object;
selecting a virtual object in a virtual environment library for the physical object based on the estimated object type; and
positioning the virtual object in the version of the CGR environment to align with a respective position of the unidentified physical object in the physical environment.

10. A system comprising:
an electronic device with a display and an image sensor;
a processor; and
a computer-readable storage medium comprising instructions that upon execution by the processor cause the system to perform operations, the operations comprising:
obtaining first content, using the image sensor, representing a physical environment in which the electronic device is located; and
detecting a physical feature corresponding to a physical object in the physical environment using the first content;
generating second content representing a version of a computer-generated reality (CGR) environment based on the physical feature, the generating comprising positioning a virtual feature in the version of the CGR environment based on the physical feature, wherein the virtual feature is positioned differently in other versions of the CGR environment based on physical features of different physical objects in different physical environments having distinct physical environment geometries, the distinct physical environment geometries having different spatial locations of different physical boundaries and the different physical objects; and
presenting, on the display, the second content representing the CGR environment.

11. The system of claim 10, wherein the instructions, when executed, further cause the system to perform additional operations, the additional operations comprising:
approximating a physical layout corresponding to an area of the physical environment proximate to the electronic device using the image sensor; and
defining a virtual layout of the version of the CGR environment based at least in part on the physical layout.

12. The system of claim 10, wherein generating the second content representing the CGR environment comprises:
overlaying a region of the display corresponding to the physical object in accordance with predefined replacement rules that define a theme of the CGR environment.

13. The system of claim 12, wherein presenting, on the display, the second content representing the version of the CGR environment comprises:
locating a visual representation of the physical object in the region of the display corresponding to the physical object.

14. The system of claim 13, wherein the visual representation of the physical object is a virtual object selected based on determining that positioning the virtual object in the region of the display corresponding to the physical object comports with the theme of the CGR environment.

15. The system of claim 10, wherein generating the second content representing the version of the CGR environment comprises:
defining an interaction between a virtual object and the physical feature based on the physical feature.

16. The system of claim 10, wherein the instructions, when executed, further cause the system to perform additional operations, the additional operations comprising:
responsive to detecting that the physical feature is within a threshold distance of the electronic device using the image sensor, presenting a visual representation associated with the physical feature on the display.

17. The system of claim 10, wherein the image sensor is a component of a depth camera.

18. A method comprising:
at an electronic device with a display and an image sensor:
obtaining first content, using the image sensor, representing a physical environment in which the electronic device is located;
detecting a physical feature corresponding to a physical object in the physical environment using the first content;
generating second content representing a version of a computer-generated reality (CGR) environment based on the physical feature, the generating comprising positioning a virtual feature in the version of the CGR environment based on the physical feature, wherein the virtual feature is positioned differently in other versions of the CGR environment based on physical features of different physical objects in different physical environments having distinct physical environment geometries, the distinct physical environment geometries having different spatial locations of different physical boundaries and the different physical objects; and presenting, on the display, the second content representing the CGR environment.

19. The method of claim 18, wherein generating the second content representing the CGR environment comprises:
   selecting a virtual feature; and
   positioning the selected virtual element in the version of the CGR environment to align with a position of the physical feature in the physical environment relative to the electronic device.

20. The method of claim 19, wherein the selected virtual element represents a peripheral boundary of the physical object in the version of the CGR environment.

\* \* \* \* \*